:## (12) United States Patent
Kim

(10) Patent No.: US 6,188,876 B1
(45) Date of Patent: Feb. 13, 2001

(54) SYSTEM AND METHOD FOR REMOTE MONITORING OF RF UNITS IN BASE STATION OF WIRELESS COMMUNICATION NETWORK

(75) Inventor: Yong-Hun Kim, Kyunggi-Do (KR)

(73) Assignee: Fine Digital, Inc., Seoul ( * ) Notice: Under 35 U.S.C. 154(b), the term of this patent shall be extended for 0 days.

(21) Appl. No.: 09/014,979

(22) Filed: Jan. 28, 1998

(51) Int. Cl.[7] .................................................. H04B 17/00
(52) U.S. Cl. ........................ 455/67.1; 455/9; 455/67.4; 455/424; 370/241; 379/1; 379/29
(58) Field of Search .................................. 379/10, 15, 24, 379/29, 1; 370/241, 249, 252; 455/424, 67.1, 9, 67.4

(56) References Cited

U.S. PATENT DOCUMENTS

| | | | |
|---|---|---|---|
| 5,337,316 | * 8/1994 | Weiss et al. | 714/716 |
| 5,521,904 | * 5/1996 | Eriksson et al. | 370/249 |
| 5,572,510 | * 11/1996 | Koivu | 370/252 |
| 5,606,319 | * 2/1997 | Yatim et al. | 341/144 |
| 5,742,589 | * 4/1998 | Murata | 370/249 |
| 5,793,749 | * 8/1998 | Helwig et al. | 370/241 |
| 5,875,230 | * 2/1999 | Ganley et al. | 379/29 |
| 5,875,398 | * 2/1999 | Snapp | 455/424 |

* cited by examiner

*Primary Examiner*—Lee Nguyen
*Assistant Examiner*—Isaak R. Jama
(74) *Attorney, Agent, or Firm*—Arent Fox Kintner Plotkin & Kahn PLLc

(57) ABSTRACT

The present invention relates to a system and a method for monitoring and controlling RF signal processing units in a wireless communication network, and, more particularly, system and method for remotely monitoring and controlling the functional status of RF signal processing units of numerous base stations in a wireless communication network by extracting the spectrum feature of high frequency that is processed by the RF signal processing unit and represents the functional status of the RF unit in each base station, and then comparing the extracted spectrum with the predetermined spectrum curve in the remote site.

8 Claims, 4 Drawing Sheets

SYSTEM AND METHOD FOR REMOTE MONITORING OF RF UNITS IN BASE STATION OF WIRELESS COMMUNICATION NETWORK

BACKGROUND OF THE INVENTION

1. Field of the Invention

The present invention relates to monitoring a system and a method for radio frequency (RF) processing units of a plurality of base stations in a wireless communication network, and, in particular, to a system and a method for remote monitoring spectrums of RF signals of the specific points at RF signal processing units, and controlling radio-frequency processing units of base stations in such networks after comparing the monitored spectrums with standard ones.

2. Brief Description of the Prior Art

The radio frequency(RF) processing unit including RF receiving and transmitting portion is one of the important units of a base station in a wireless communication network. The RF receiving portion comprises a receiving antenna; a low noise amplifier(LNA), which filters and amplifies the RF signal received through a receiving antenna; and a down converter which converts down the received RF signal(100 MHz~10 GHz) to an intermediate frequency(IF) signal(1 MHz~100 MHz). The RF transmitting portion comprises an up converter, which converts up an IF signal to an RF signal; a linear power amplifier(LPA), which amplifies the converted RF signal; and a transmitting antenna. The RF receiving/transmitting portion of base station is composed of analog circuits, so the functional characteristics of the RF signal processing unit gradually deteriorates unlike other units of the base station composed of digital circuits. Because of this gradual deterioration, it is difficult to detect faults or determine the time when an RF signal processing unit is to be replaced.

Technicians have conventionally visited each base station in order to check the functional status of the RF signal processing units by measuring their frequency characteristics with a spectrum analyzer to fix or replace the unit when its spectrum shape has changed from the normal spectrum shape. With such a human monitoring system, it is inconsistent and unreliable to decide about faults, repair time, or the replacement time for the RF signal processing unit; moreover, such a decision depends on the skill of the technician. As demand for high-quality service in wireless communication system demands more base stations, human monitoring system becomes less efficient and economical. Therefore, it becomes necessary to develop a new and effective monitoring systems and methods.

SUMMARY OF THE INVENTION

Accordingly, it is a general object of the present invention to solve the above mentioned problems of the conventional human monitoring system and to provide novel and effective monitoring systems for the RF signal processing units for multiple base stations in a wireless communication network.

A more specific object of the present invention is to provide monitoring methods and systems in which a monitoring unit can remotely monitor and control the RF signal processing units for numerous base stations in a wireless communication network.

Another further specific object of the present invention is to again provide such monitoring methods and systems for numerous base stations wherein data communication between a monitoring unit and a remote control command unit can be performed irrespective of the bandwidth or channel capacity for the link connecting them.

The foregoing objects of the present invention are accomplished by providing the remote monitoring system of the RF signal processing units of the base stations comprising: (1) a feature extraction unit for extracting features representing the functional status of the RF signal processing unit, which is comprised of a selection means for choosing a specified point among the numerous points to be detected, an extraction means for converting down RF signal detected at the chosen point into IF signal, a means for measuring the power spectrum of the intermediate (IF) signal, an A/D converter for digitizing the power spectrum, a transmitter for transmitting the digitized signal of the power spectrum, and a control command processor; (2) a remote monitoring unit comprising a means for evaluating the functional status of the RF signal processing unit based on the power spectrum received from the previously described feature extraction unit, and a controller for sending a control command associated with the result of the evaluation to the control command processor in the feature extraction unit; and (3) a communication link between the feature extraction unit and the remote monitoring unit, wherein the control command processor in the feature extraction unit which performs the command received through the communication link from the controller of the remote monitoring unit.

The present invention is characterized in that the remote monitoring system comprises: (1) a feature extraction unit for extracting features representing the functional status of the RF signal processing unit, which is comprised of a selection means for choosing a point among numerous points to be detected, an extraction means for converting down the RF signal detected at the chosen point into an IF signal whose frequency is low enough to be digitized, an A/D converter for digitizing the IF signal, a memory for storing the digitized signal, a transmitter for transmitting the stored digital signal, and a control command processor; (2) a remote monitoring unit comprising a power spectrum calculator for computing the power spectrum of the real-time digital signal received from the feature extraction unit, an evaluation means for evaluating functional status of the RF signal processing unit based on the computed power spectrum, and a controller for sending a control command associated with the result of the evaluation to the control command processor in the feature extraction unit; and (3) a communication link between the feature extraction unit and the remote monitoring unit.

The present invention is further characterized in that the transmitter of the feature extraction unit transmits the digitized signal stored in the memory through the communication link at transmission rate lower than the rate at which the detected analog signal is digitized.

The present invention is further characterized in that the remote monitoring method of the RF signal processing units of the base stations comprises the steps of: (1) choosing one of the many points to be detected for a RF signal processing unit in a base station; (2) converting down the RF signal detected at the chosen point into an IF signal; (3) measuring the power spectrum of the converted IF signal; (4) converting the power spectrum into digital data; (5) transmitting the digital data representing the power spectrum; (6) evaluating the functional status of the RF signal processing unit based on the transmitted digital data; (7) sending an appropriate control command associated with the result of the evaluation; and (8) executing the control command. In addition, instead of using the step for measuring the power spectrum, the step of computing the power spectrum can be also done between the steps of transmitting and evaluating.

The remote monitoring system according to the present invention remotely monitors and controls the RF signal processing unit of each base station in the following way. The selection means chooses one of the many points to be detected and an extraction means converts down the RF signal detected at the chosen point during a predetermined time into an IF signal. Then the power spectrum of the IF signal is measured by the spectrum measuring means and then the measured spectrum signal is digitized by the A/D converter. The digitized data representing a power spectrum are finally transmitted to the remote monitoring unit by the transmitter through the communication link. The evaluation means of the remote monitoring unit checks the functional status of the RF signal processing unit based on the spectrum data received from the feature extraction unit. According to the result of the evaluation, the controller sends a data, such as commanding to replace the RF module working at present with a redundant RF module, to the control command processor of the feature extraction unit.

The remote monitoring system according to the present invention can be also configured such that, instead of the spectrum measuring means of the feature extraction unit, the power spectrum calculator is located in the remote monitoring unit. In such a configuration, the function of the feature extraction unit is simply to transmit digitized data of real-time analog IF signals converted from the detected one at the chosen point. However, the A/D conversion rate may be beyond the bandwidth or channel capacity of the communication link. Therefore, the A/D converter just stores the real-time sampled data into the memory temporarily and the transmitter slowly transmits the stored data at the transmission rate which is within the bandwidth of the communication link.

The communication link between the feature extraction unit and the remote monitoring unit is bi-directional, which enables not only the feature that is extracted by the feature extraction unit to be transmitted to the remote monitoring unit, but also enables control commands to be sent from the remote monitoring unit to the control command processor of the feature extraction unit. In addition, the decision of the evaluation means as to whether or not the feature indicates some fault may be made automatically by an algorithm which compares the acquired features with a standard feature.

With the remote monitoring method according to the present invention, the RF signal processing unit of the base station is monitored and controlled in the following way. One of the many points is chosen to be checked and then the RF signal detected at the chosen point during a predetermined time is converted down into an IF signal. After this, the power spectrum of the IF signal is measured and then the spectrum signal is digitized. Finally, the digitized spectrum data are transmitted to the remote monitoring unit through the communication link. Based on the transmitted data, evaluation is made as to whether or not there are faults in the RF signal processing unit and a replacement is necessary. A control command suitable to the result of the evaluation is chosen and sent to the control command processor in the feature extraction unit.

Moreover, the sequence in steps of the remote monitoring method according to the present invention may be changed such that computing the power spectrum is performed after transmitting the real time digitized data from the IF signal. The change in the sequence of steps requires an additional step of storing the A/D converted signal temporarily into a memory prior to transmission. The memory size should be enough to store the data sampled at 2 fc (fc is the maximum frequency in the IF signal) for a several cycles of IF signal. It is to be understood that both the foregoing general description and the following detailed description are provided for exemplary and explanatory purposes only, and intended to provide a further explanation of the invention as claimed.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings.

DETAILED DESCRIPTION OF THE PREFERRED EMBODIMENTS

The configuration and operation of a preferred embodiment of the present invention will now be explained in detail with reference to the accompanying drawings.

Figure 1:
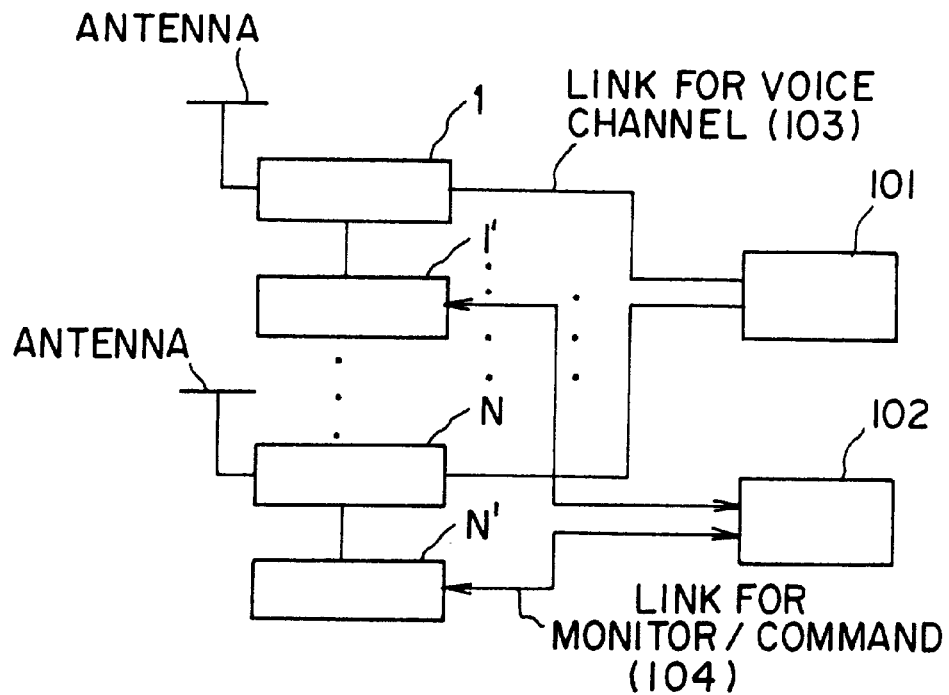
FIG. 1 is a block diagram of the remote monitoring system according to the present invention in base stations in a wireless communication network.

Referring to FIG. 1, there is shown a remote monitoring system for the RF signal processing units applied to part of the wireless communication network, comprising base stations 1 to N, an exchanger 101, and links for voice channels 103 between the base stations 1 to N and the exchanger 101. As shown in therein, the remote monitoring system comprises feature extraction units 1' to N', which extract feature that reflects the current functional condition of the RF signal processing unit in each base station; a monitoring unit 102, which remotely monitors all the RF signal processing units; and communication links 104, which is the path for monitored and commanding data, between the monitoring unit 102 and all the feature extraction units 1' to N'.

Each of base stations 1 to N is hardwired to communicate with the exchanger 101 through the voice channel link 103. Each of the feature extraction units 1' or N' is installed and is connected to each of base stations 1 to N in order to extract, from several detecting points in the RF receiving portion 210 and the RF transmitting portion 220, some feature that indicates the current functional conditions of the RF signal processing unit, e.g., existence of faults, malfunction, or the extent that its function has degraded. The extracted feature is transmitted to the remote monitoring unit 102 through the communication link 104. Then, based on the received feature, a decision is made as to whether or not some faults arise or replacement with the redundant RF unit is required. In addition, if it is necessary, the associated control command, such that the RF signal should be processed in the redundant RF unit, is sent to the feature extraction unit of the associated base station.

Through the bi-directional communication link 104, the feature extraction units 1' to N' transmit the extracted feature of the RF signal processing unit of the associated base station to the remote monitoring unit 102. An appropriate control command is chosen based on the result of comparing the received feature with the normal one, and then is sent from the remote monitoring unit 102 to the feature extraction unit in the associated base station through the communication link 104. In this way, the current RF signal processing unit in which some faults are detected or some malfunction is processed can be replaced by another RF signal processing module that is reserved for fault occurrence. The decision as to whether or not the feature represents some problems to be resolved is made by either a human expert or automatic algorithm. A standard telephone line, an exclusive line, T1 trunk line or E1 trunk line can be used as the communication link 104.

When transmitted from the feature extraction unit 1' or N' to the remote monitoring unit 102, the feature can be in the form of either raw digital data converted from the detected analog signal or in the form of the processed data representing the power spectrum measured directly from the analog signal. To be specific, the analog signal detected, for some predetermined duration at a particular detecting point of the RF signal processing unit, is digitized into raw data in real time and stored temporarily in a memory of the feature extraction unit. Then, the digital raw data is transmitted at a lower rate within the bandwidth of the communication link 104 to the remote monitoring unit 102 which computes the power spectrum after digital signal processing of the obtained raw data. On the other hand, by inserting each spectrum measuring part (403 in FIG. 4) into all the feature extraction units 1' to N', the power spectrum can be also measured in the feature extraction unit. The signal curve of the measured spectrum is digitized and is then transmitted.

Figure 2:
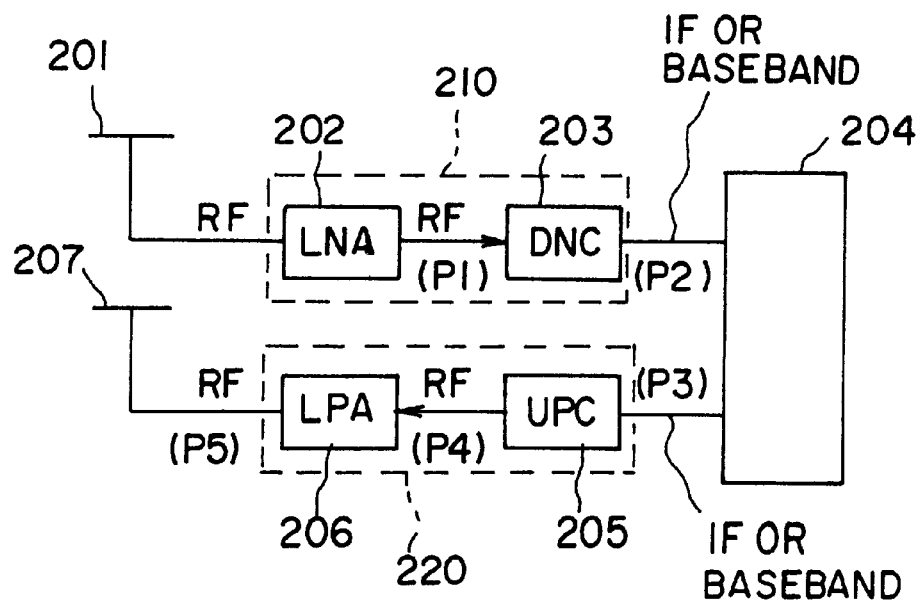
FIG. 2 is a block diagram of the RF signal processing unit in a base station.

Referring to FIG. 2, there is shown a block diagram of the RF signal processing unit in a base station. The RF signal processing unit comprises the receiving antenna 201, low noise amplifier(LNA) 202, down converter 203, up converter 205, linear power amplifier(LPA) 206, transmitting antenna 207, and other auxiliary units 204. The RF signal received by the antenna 201 is supplied to LNA 202 which amplifies the received RF signal while maintaining low noise level. The output of the LNA 202 is supplied to the down converter 203, which converts down the received RF signal into an intermediate or base-band frequency signal. Contrarily, the function of the up converter 205 is to convert up intermediate or base-band frequency signals into an RF signal. The output of the up converter 205 is supplied to the LPA 206 for amplifying the RF signal and is then transmitted in the air through the transmitting antenna 207.

As shown in FIG. 2, there are several critical detecting points in the RF signal processing unit of the base station to check its functional condition. For example, a detecting point P1 between the LNA 202 and the down converter 203 and a point P2 between the down converter 203 and auxiliary units 204 of base station are chosen to examine the functional deterioration of the LNA 202 and the down converter 203, respectively. These detecting points P1 and P2 are used for monitoring the RF receiving portion. On the other hand, a detecting point P3 between the auxiliary units 204 and the up converter 205 and a point P4 between the up converter 205 and the LPA 206 are chosen to monitor the functional deterioration of the transmitting portion 204 and the up converter 205, respectively. In addition, to detect the functional degradation of the LPA 206, the RF signal is detected at point P5 between the LPA 206 and the antenna 207. Detecting points P3, P4, and P5 are used for monitoring the RF transmitting portion and the detecting points that are used for the feature extraction unit are composed of some part of P1 to P5, or all of them.

Figure 3:
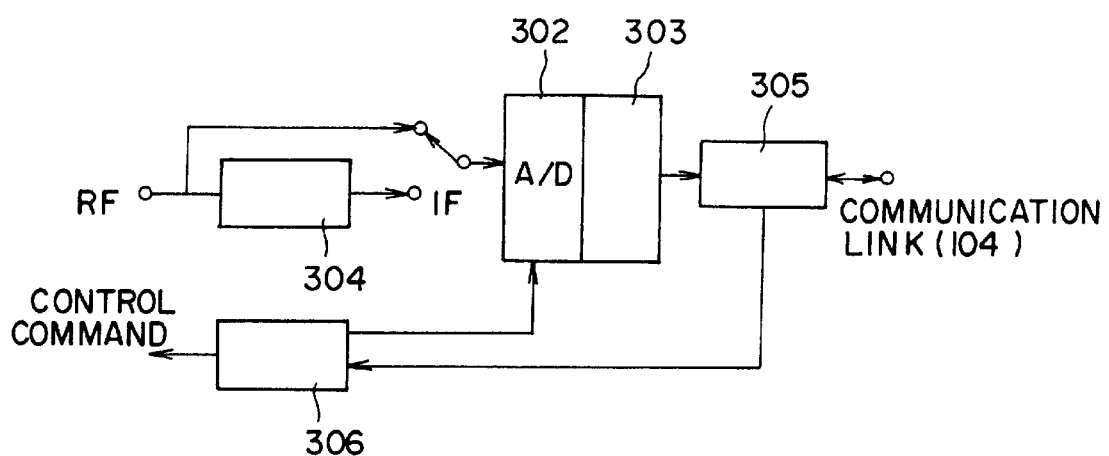
FIG. 3 is a block diagram of the feature extraction unit of a first embodiment of the present invention for extracting frequency characteristics of the RF signal processing unit.

Referring to FIG. 3, there is shown a block diagram of a preferred embodiment of the feature extraction unit 1' or N' that comprises RF/IF converter 301, A/D converter 302, memory 303, communication line interface 305, and control command processor 306. Because the frequency of the carrier signal used in wireless communication is usually in the range of 100 MHZ to 10 GHz, it is impossible to directly digitize the signal with such a high frequency range. The RF/IF converter 301 is needed to convert down the detected RF signal into an IF signal whose frequency is low enough to be digitized. This frequency to be digitized is less than 100 MHZ. Therefore, the A/D converter 302 can digitize the converted IF signal whose frequency has been lowered enough. Accordingly, because signals detected at the checking points P1, P4 and P5 are RF signals, they are supplied to the RF/IF converter 301 whose output signals are then digitized by the A/D converter 302. The well-known superheterodyne receiver can be used as the RF/TF converter 301. On the other hand, signals detected at the checking points P2 and P3 are directly digitized by the A/D converter 302 because their frequencies are low enough to be digitized directly.

In order to transmit a digitized signal in real-time, detected at the chosen point to the remote monitoring unit 102 through communication link 104 of FIG. 1 by means of the communication line interface 305, the transmission bandwidth of the communication link 104 should be twice as wide as the intermediate frequency (or base-band frequency), which is practically impossible because a telephone line is usually used as the communication link 104. Therefore, the digitized data for detected signal are temporarily stored in real time into the memory 303 of the feature extraction unit for some predetermined duration, e.g., from several seconds to several minutes. Then, they are sent to the remote monitoring unit 102 at a low transmission rate within the bandwidth of the communication link 104.

The function of the control command processor 306 is to execute commands received from the remote monitoring unit 102, such as replacement of the current RF signal processing unit with another redundant RF signal processing unit that is reserved for fault or malfunction occurrence.

Figure 5:
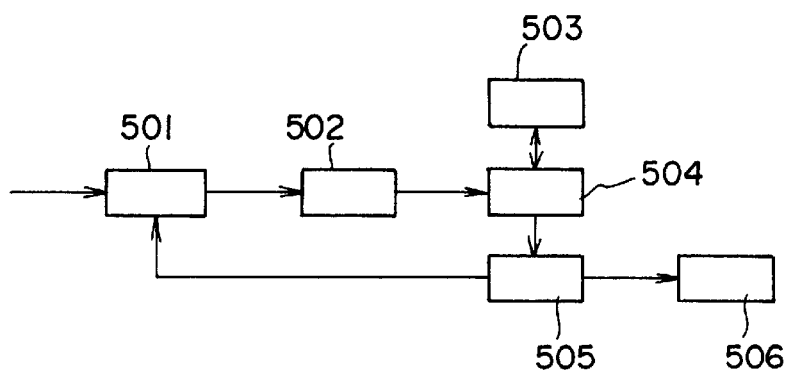
FIG. 5 is a block diagram of remote monitoring unit of a first embodiment of the present invention.
Figure 7:
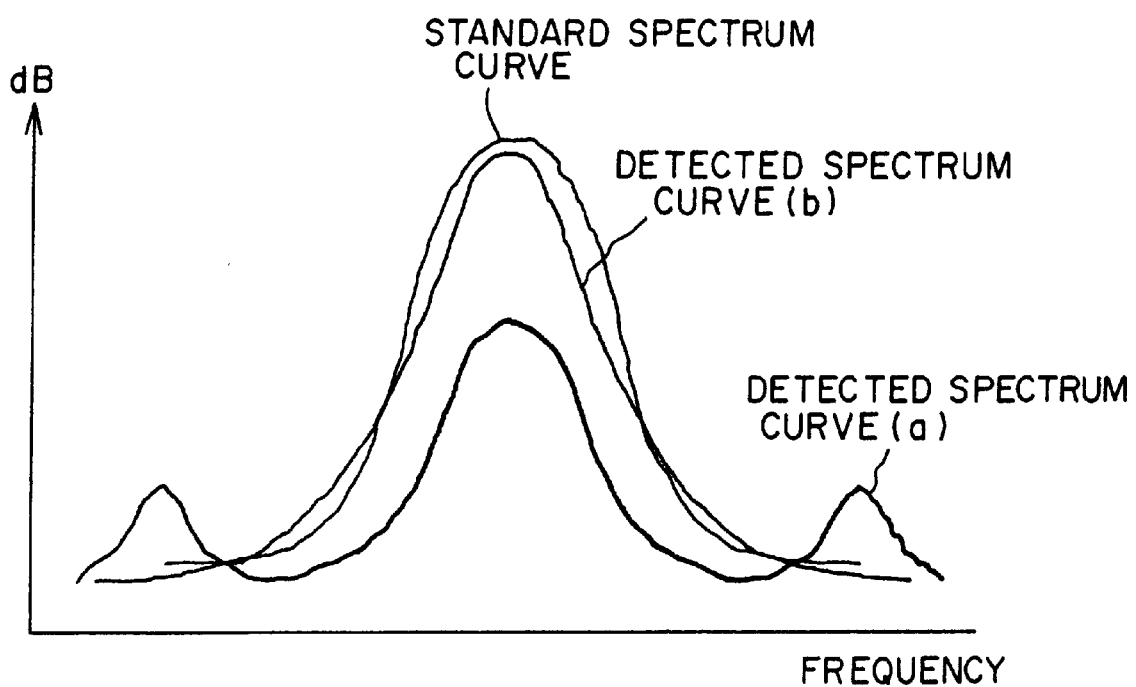
FIG. 7 illustrates the exemplary reference power spectrum and the power spectrum of the signal extracted from the RF signal processing unit.

Referring to FIG. 5, there is shown a block diagram of the remote monitoring unit 102 comprising a communication line interface 501, a spectrum calculator 502, a memory 503, a comparator 504, a controller 505, and a displayer 506. The spectrum calculator 502 computes the power spectrum of the sampled digital data received from the feature extraction unit through the communication link connector 501. The output of the spectrum calculator 502 is a digital spectrum curve and is then supplied to the comparator 504, whose function is to figure out the amount of deviation from a standard spectrum curve at every frequency interval of the digital curve. The standard spectrum curve representing a reference power spectrum is kept in the memory 503 (FIG. 7) in the form of digital data. The comparator 504 sends a particular signal to the controller 505 when the amount of deviation becomes greater than a predetermined deviation value. If the obtained spectrum curve has a shape as shown in (a) of FIG. 7 whose amount of deviation from a standard curve is large, then it is likely to represent an abnormal one. On the other hand, the curve (b) of FIG. 7 may be still determined normal one because of its closeness to the standard shape. On receiving the signal from the comparator 504, the controller 505 transmits an appropriate command such as replacement or suspending operation to the control command processor 306 of the feature extraction unit and causes the displayer 506 to display a graph of the deviation and/or contents of the command sent to the control command processor 306.

Figure 4:
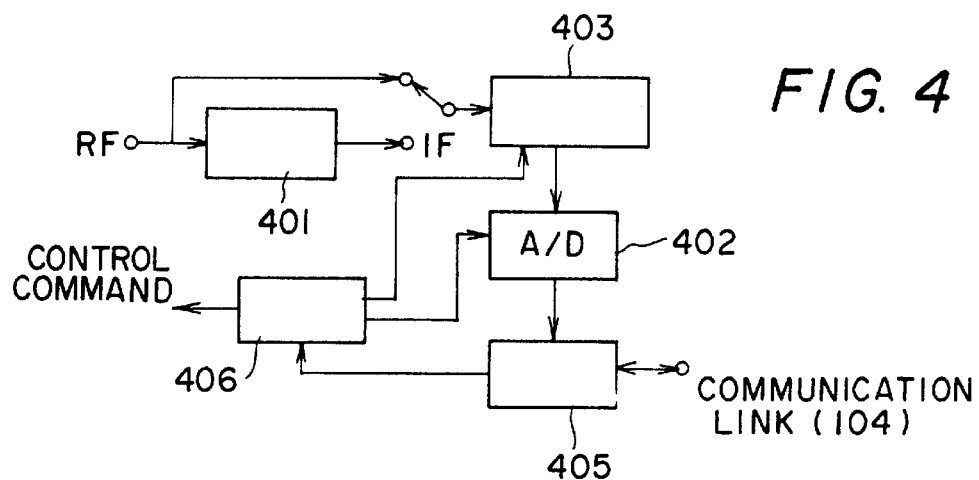
FIG. 4 is a block diagram of the feature extraction unit of a second embodiment of the present invention for extracting frequency characteristics of the RF signal processing unit.
Figure 6:
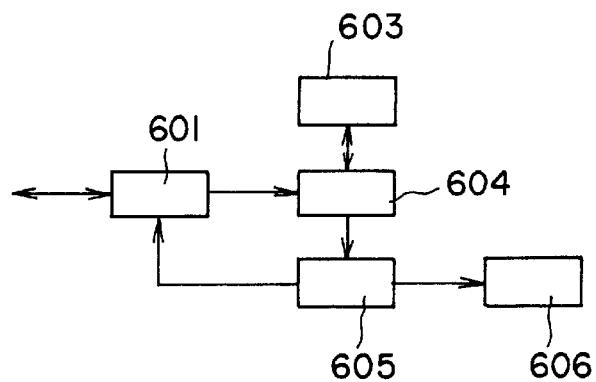
FIG. 6 is a block diagram of remote monitoring unit of a second embodiment of the present invention.

Referring to FIG. 4, there is shown a block diagram of another embodiment of the feature extraction unit 1' or N' according to the present invention. The feature extraction units 1' to N' have the same constituting components as that shown in FIG. 3, and includes a spectrum measuring part 403. Because the function of the feature extraction unit of FIG. 3 is to transmit raw digital data sampled from a real time signal to the remote monitoring unit 102 of FIG. 1, the remote monitoring unit 102 should be equipped with the spectrum calculator 502 to extract the spectrum feature from the received raw data required to examine the functional degradation of the RF signal processing unit. However, in the feature extraction unit 1' or N' of FIG. 4, the spectrum measuring part 403 acquires the spectrum curve directly from the analog signal and it is then digitized by the A/D converter 402. The digitized data from the spectrum curve or shape is transmitted to the remote monitoring unit 102 of FIG. 1. Therefore, the remote monitoring unit 102 does not need to be equipped with any digital signal processing element for obtaining power spectrum from real-time signal. FIG. 6 shows the block diagram of the remote monitoring unit 102, which does not contain the element for obtaining power spectrum. Once the digitized power spectrum is received via the communication link connector 601, the comparator 604 performs the same function as that of FIG. 5 by using the reference power spectrum kept in the memory 603.

The remote monitoring system for the RF signal processing unit in the base stations monitors and controls, efficiently and economically, functional conditions and characteristics of the RF signal processing units for numerous base stations in a wireless communication system like cellular phone, pager, personal communication service (PCS), and CT-2. Furthermore, its capability of transmission through narrow bandwidth communication links leads to more economical and practical remote monitoring system since no additional equipment with wide bandwidth communication links is necessary.

The foregoing is provided only for the purpose of illustration and explanation of the preferred embodiment of the present invention, so changes, variations and modifications may be made without departing from the spirit and scope of the invention.

What is claimed is:

1. A system for remotely monitoring and controlling the RF signal processing units in a base station of a wireless communication network, comprising:

a means for choosing a point among the numerous checking points of the RF signal processing unit;

a means for converting down the RF signal detected from the chosen point into a IF signal;

a means for measuring the power spectrum of the converted analog IF signal;

a means for digitizing the measured power spectrum;

a means for transmitting the digitized data through a communication link; and a remote monitoring unit for evaluating the functional status of the RF signal processing unit based on comparison of the received digitized data representing a power spectrum through the communication link with a pre-stored standard spectrum data.

2. A system for remotely monitoring and controlling RF signal processing units according to claim 1, further comprising a control command processor for processing the control command received from a controller through the communication link.

3. A system for remotely monitoring and controlling RF signal processing units according to claim 2, in which said remote monitoring unit comprises:

a means for evaluating the functional status of the RF signal processing unit based on digitized data representing the power spectrum received through said communication link; and said controller for sending an appropriate control command associated with the evaluation to said control command processor through the communication link.

4. A system for remotely monitoring and controlling RF signal processing units in a base station of a wireless communication network, comprising:

a means for choosing a point among numerous checking points of the RF signal processing unit;

a means for converting down the RF signal detected from the chosen point into an IF signal whose frequency is low enough to be digitized;

a means for digitizing the converted signal;

a means for storing the digital signal;

a means for transmitting the digital signal stored in said storing means through a communication link; and a means for evaluating the functional status of the RF signal processing unit based on comparison of said computed power spectrum with a pre-stored standard spectrum data.

5. A system for remotely monitoring and controlling RF signal processing units according to claim 4, further comprising a control command processor for processing the control command received from a controller through the communication link.

6. A system for remotely monitoring and controlling RF signal processing units according to claim 5, in which said controller sends an appropriate control command associated with said evaluation to said control command processor through the communication link.

7. A method of remotely monitoring and controlling RF signal processing units at base stations in a wireless communication network, comprising the steps of:

choosing a point among numerous checking points of an RF signal processing unit;

converting down the RF signal detected at the chosen point into an IF signal;

measuring the power spectrum of the IF signal as a curve on the frequency band;

converting said power spectrum curve into a digital signal;

transmitting said digital signal; and evaluating the functional status of the RF signal processing unit based on said digital signal representing the frequency spectrum.

8. A method of remotely monitoring and controlling RF signal processing units at base stations in a wireless communication network, comprising the steps of:

choosing a point among numerous checking points of an RF signal processing unit;

converting down the RF signal detected at the chosen point into an IF signal whose frequency is low enough to be digitized;

converting and storing the IF signal into a digital signal;

transmitting the stored digital signal at a transmission rate lower than a digitizing rate at said converting step;

computing the power spectrum by digital signal processing the transmitted digital signal representing part of the real time signal; and evaluating the functional status of said RF signal processing unit based on the computed power spectrum.

\* \* \* \* \*